United States Patent [19]
Lawrence

[11] Patent Number: 5,899,664
[45] Date of Patent: May 4, 1999

[54] OSCILLATING FLUID FLOW MOTOR

[76] Inventor: Brant E. Lawrence, 26600 Gail La., Middleton, Id. 83644

[21] Appl. No.: 08/843,578

[22] Filed: Apr. 14, 1997

[51] Int. Cl.⁶ .................................................. F03D 5/06
[52] U.S. Cl. ...................... 416/83; 416/197 A; 417/334
[58] Field of Search ................ 415/2.1, 3.1, 4.1, 415/7, 905, 906; 416/6, 64, 65, 79, 80, 83, 197 A; 417/334; 290/43

[56] References Cited

U.S. PATENT DOCUMENTS

| | | | |
|---|---|---|---|
| 705,967 | 7/1902 | Roeh | 416/83 |
| 802,228 | 10/1905 | Morton | 416/83 |
| 804,676 | 11/1905 | Roeh | 416/83 |
| 830,973 | 9/1906 | De Camp | 416/79 |
| 905,320 | 12/1908 | Isham | 416/83 |
| 4,753,574 | 6/1988 | Hess | 416/83 |

*Primary Examiner*—Christopher Verdier
*Assistant Examiner*—Ninh Nguyen
*Attorney, Agent, or Firm*—Ormiston Korfanta & Holland, PLLC

[57] ABSTRACT

An oscillating fluid flow motor and an in-stream fluid flow power system that converts the energy in the flowing fluid to mechanical energy through a vane that automatically sweeps back and forth across the flow. The oscillating fluid flow motor consists of (1) a vane having a concave front face confronting the flow of fluid, (2) an elongated swing arm attached at one end to the vane, and (3) a direction control mechanism operatively coupled to the swing arm. The direction control mechanism is configured to rotate the swing arm about its longitudinal axis to re-orient the vane and thereby change the direction the vane moves across the stream.

17 Claims, 6 Drawing Sheets

OSCILLATING FLUID FLOW MOTOR

CROSS REFERENCE TO RELATED APPLICATION

This application is related to application Ser. No. 08/144,734 filed Oct. 28, 1993, abandoned.

FIELD OF THE INVENTION

The invention relates generally to a mechanism for converting energy of one form to another more useable form. More particularly, the invention relates to an oscillating fluid flow motor that converts energy contained in a stream of flowing fluid to mechanical energy.

BACKGROUND OF THE INVENTION

Numerous mechanisms have been designed and built for converting the energy of moving fluid, such as air or water, to mechanical energy. Commonly known mechanisms for converting the energy of moving water to mechanical energy are water wheels, paddles and turbines. Generally speaking, mechanisms for converting the energy of a moving fluid to mechanical power have tended throughout their evolution to become both more complicated and more costly to manufacture. Modern axial flow turbine systems typically require the construction of dams or diversions and penstocks to support even low-head power production. The present invention was developed in an effort to provide a low cost in-stream system for utilizing the energy in a fluid stream, particularly a small slow moving stream, as a pumping station or a small scale electrical generator such as might be used effectively in remote or undeveloped areas around the world.

In the early 1900s, John Roeh patented an Automatic Current Motor, U.S. Pat. Nos. 705,967 and 804,676, that extracted energy from a stream flow using a vane attached to a tiller. As the water flows past the vane, the vane automatically sweeps back and forth across the stream under the bi-directional control of a cross cabling system. A connecting rod transmits the energy in the oscillating tiller to some type of receiving machine to produce useful work. Mr. Roeh's system, while presenting a potentially workable small scale in-stream generating or pumping station, is disadvantageous because it requires a fairly complex mechanical linkage to achieve the bi-directional control necessary to make the vane sweep automatically back and forth across the stream.

SUMMARY OF THE INVENTION

The present invention is directed to an oscillating fluid flow motor and an in-stream fluid flow power system that converts the energy in the flowing fluid to mechanical energy through a vane that automatically sweeps back and forth across the flow. The oscillating fluid flow motor consists of (1) a vane having a concave front face confronting the flow of fluid, (2) an elongated swing arm attached at one end to the vane, and (3) a direction control mechanism operatively coupled to the swing arm. The direction control mechanism is configured to rotate the swing arm about its longitudinal axis to re-orient the vane and thereby change the direction the vane moves across the stream. In one exemplary embodiment of the fluid flow motor, the front face of the vane is concave along both its longitudinal and transverse axes.

When the oscillating fluid flow motor is incorporated into an in-stream fluid flow power system, the swing arm is mounted to a base so that it will pivot about a fixed point on the base. The swing arm is positioned with respect to the flowing fluid so that the vane traverses the fluid between two points which define the ends of a bi-directional stroke of the swing arm. The direction control mechanism rotates the swing arm alternately clockwise and counterclockwise at the end of each stroke to reorient the vane back across the flow. A receiving machine such as an electrical generator or a pump is operatively coupled to the swing arm through, for example, a connecting rod that extends between the swing arm and the receiving machine.

DETAILED DESCRIPTION OF THE INVENTION

Figure 1:
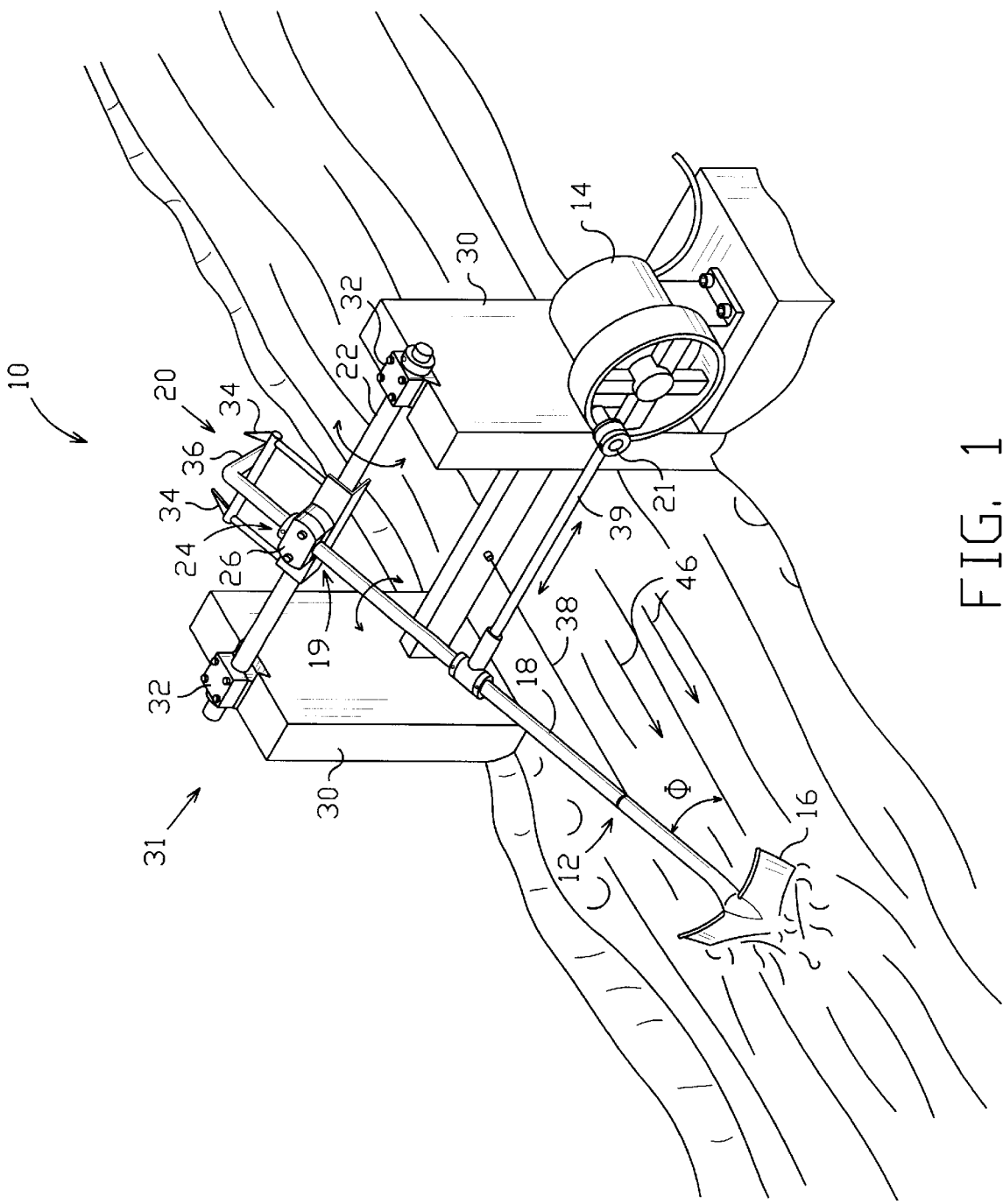
FIG. 1 is an isometric view of the oscillating fluid flow motor incorporated into an in-stream fluid power system wherein the swing arm extends away from the vane in a direction generally upstream of the vane.

FIG. 1 depicts an in-line fluid flow power system, designated generally by reference numeral 10, such as might be used in a small stream or irrigation canal as a pumping station or electric power generator. Referring to FIG. 1, power system 10 includes an oscillating fluid flow motor 12 and an on-shore receiving machine 14. Receiving machine 14 represents generally any of the various machines operable through the reciprocating motion generated by motor 12, such as a pump, electric generator or mill.

Figure 2:
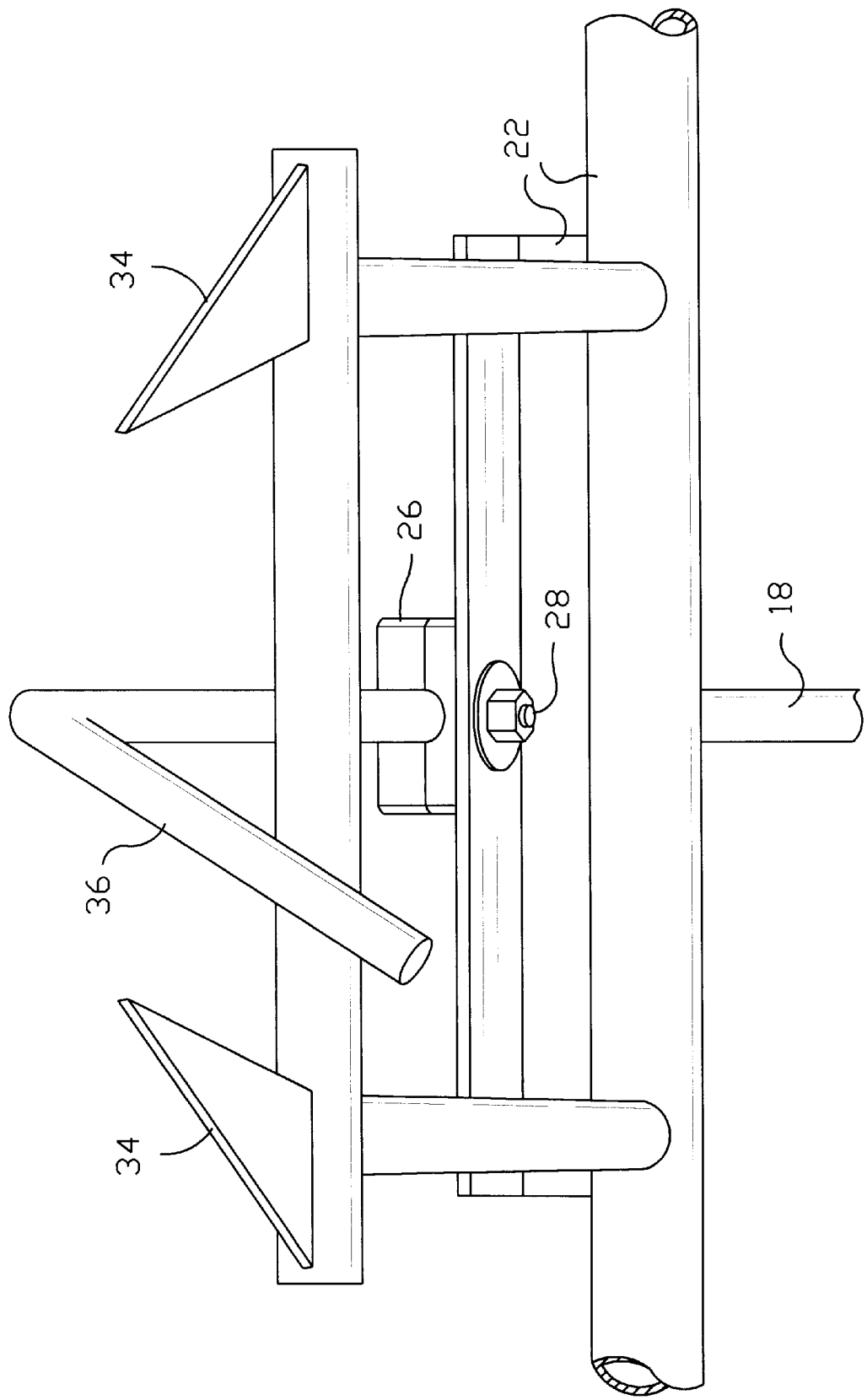
FIG. 2 is an isometric detail view of the pivot assembly showing limit arm engaging the travel stop.
Figure 3:
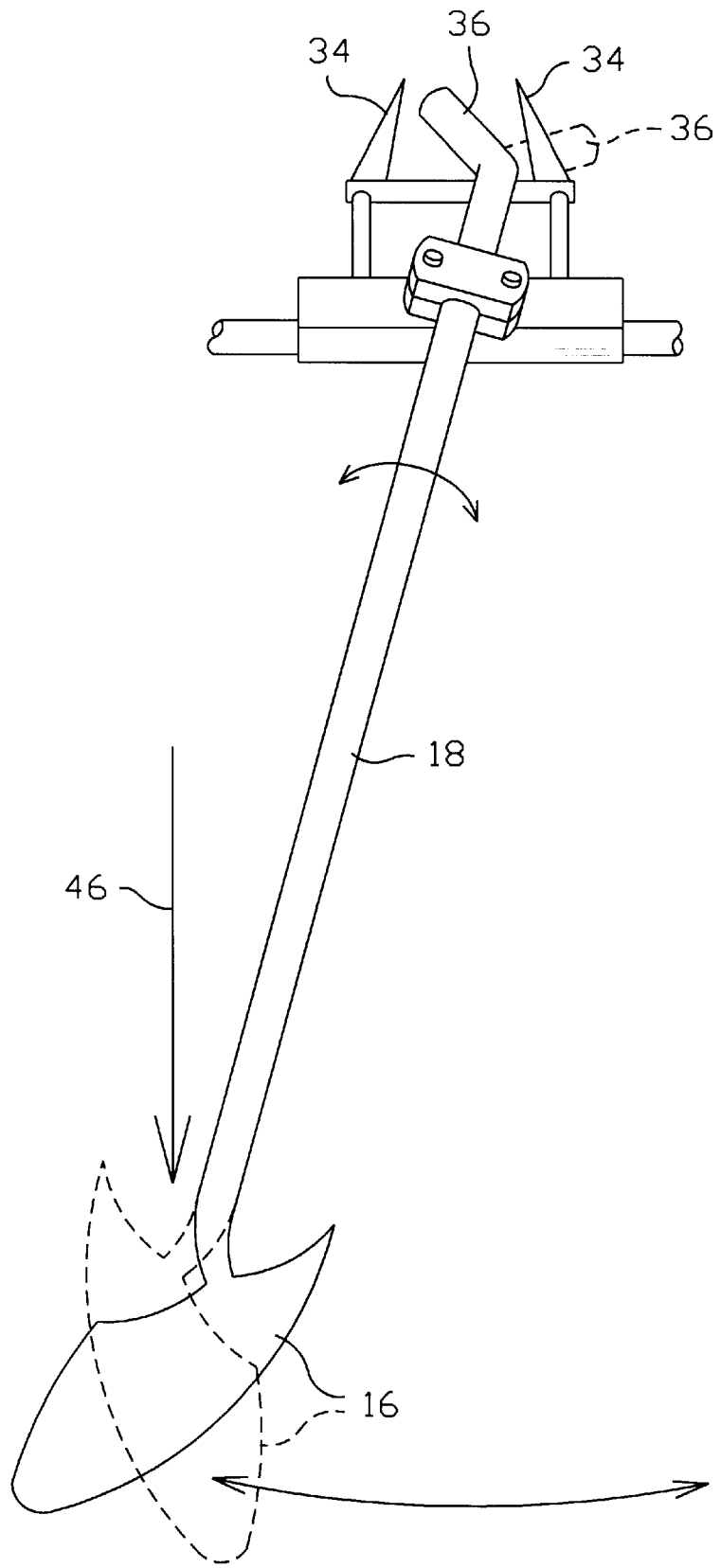
FIG. 3 is a partial isometric view of the vane and swing arm showing the change in direction at the end of one stroke of the swing arm.

Motor 12 consists of three basic components—a vane 16, a swing arm 18, and a direction control mechanism 20. Vane 16 is attached to one end of swing arm 18. Swing arm 18 is fixed along its length at a point 19 about which the swing arm rotates in a motion describing an arc at either end of swing arm 18. In the embodiment of the invention shown in FIGS. 1 and 2, swing arm 18 is mounted to a horizontal support member 22 through a pivot assembly 24. Pivot assembly 24 allows swing arm 18 to rotate and pivot relative to support member 22. Pivot assembly 22 includes pillow block 26, or another suitable bearing device, and pivot pin 28. Swing arm 18 rotates in pillow block 26 and pivots on pivot pin 28. Horizontal member 22 has two ends, each of which are secured to uprights 30 by block assemblies 32. Horizontal member 22 and uprights 30 combine to form a base 31 for motor 12. Horizontal member 22 is allowed to rotate about its longitudinal axis within block assemblies 32, thereby allowing vertical adjustment of vane 16 in relation to the surface of the flowing water. Swing arm 18 is allowed to rotate about its longitudinal axis within pivot assembly 24. Stops 34 and limit arm 36 regulate the lateral movement of swing arm 18. Limit arm 36 extends radially from swing arm 18 at some angle less than 180°.

Preferably, the vertical motion of swing arm 18 is limited to help keep the lower portion of vane 16 at a predetermined level with respect to the surface of the water. Here, this is accomplished by a tension cable 38. Also preferably, the tension on cable 38 is adjusted so that the lower edge of vane 16 is submerged and the upper edge is maintained slightly above surface level. Alternatively, a rotational stop could be installed behind horizontal support member 22 or over swing arm 18 to limit the vertical motion of swing arm 18. As an alternative to, or in combination with, these mechanical rotational stop mechanisms, vane 16 could be weighted or bouyancy added according to the anticipated flow conditions, in conjunction with the overall hydrodynamic design of the vane, to maintain vane 16 at the desired level. Other suitable mechanisms could be used. For example, the design of vane 16 could incorporate a wing or other hydrodynamic feature that reacts to the flow to keep the vane at the desired level in the stream.

Figure 9:
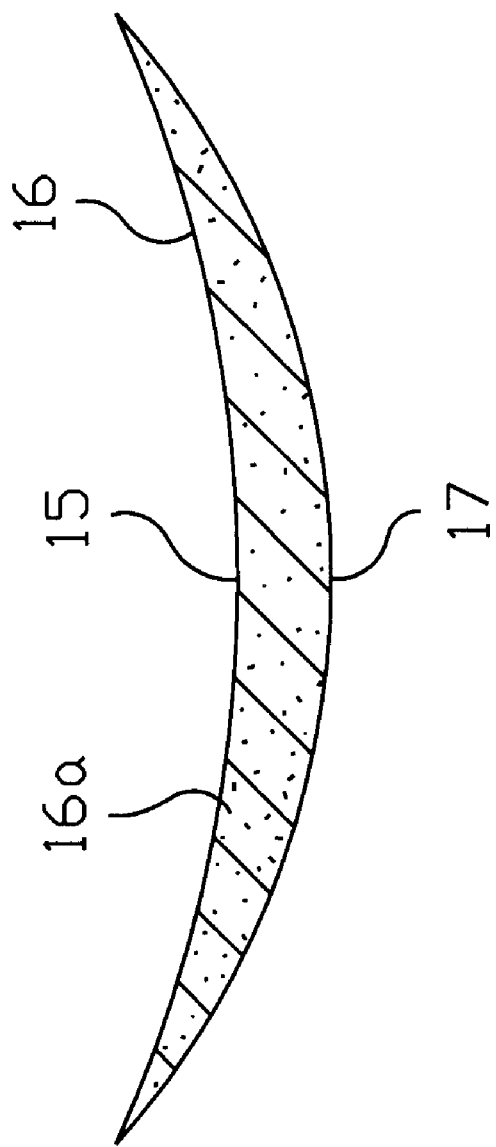
FIG. 9 is a transverse cross section view of a vane having a foam core for buoyancy.

FIG. 9 is a cross section view of a vane 16 having a core 16a made of foam or other bouyant material. The bouyancy developed by foam core 16a may be necessary in slow flows to maintain vane 16 at the desired level in the flow. It is believed that the foam core or other suitable bouyancy will also enhance performance in a variety of flow conditions by increasing the force exerted on the bouyant vane by the fluid flow as the vane is held in the flow by tensioning cable 38.

In operation, swing arm 18 is positioned above a flow of fluid, water in this case, such that front face 15 of vane 16 is positioned within and confronting flow 46. As the flow moves past front face 15, the flow forces vane 16 across the stream and swing arm 18 rotates about pivot pin 28. Swing arm 18 rotates until limit arm 36 contacts stop 34. As vane 16 traverses the flow, one edge of vane 16 is positioned upstream, while the second edge and opposite edge is positioned downstream. The leading edge is pushed into the water and acts as a rudder causing the vane to traverse the flow. The trailing edge is lifted partially out of the water, directing and shaping the spill of water as it flows past front face 15 of vane 16. As swing arm 18 reaches the outer limit of travel, defined by the location and position of stop 34 relative to limit arm 36, limit arm 36 acts against stop 34 rotating swing arm 18 inside pivot assembly 22. As swing arm 18 continues to rotate, the orientation of vane 16 in relationship to the flow is reversed. As a result, the edge of vane 16 which was previously the leading edge or rudder, is now the trailing edge, and the edge which acted originally as the trailing edge is now the leading edge or rudder. This results in a reverse in the direction of travel of vane 16 through the flow.

Figure 4:
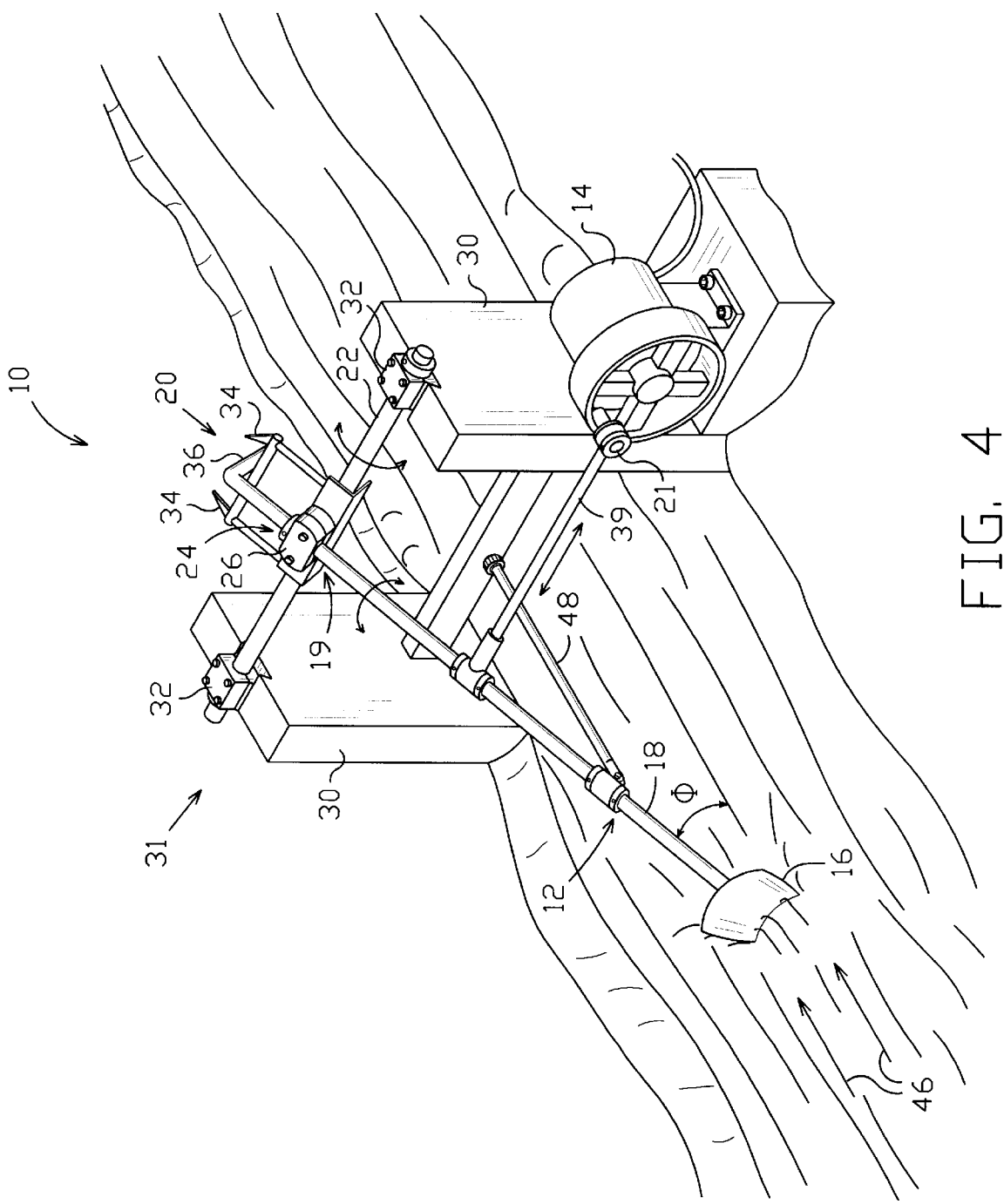
FIG. 4 is an isometric view of the oscillating fluid flow motor incorporated into an in-stream fluid power system wherein the swing arm extends away from the vane in a direction generally downstream of the vane.

The repeated oscillation of vane 16 through the flow and the associated oscillation of swing arm 18 is transferred to receiving machine 14 by a crankshaft or connecting rod. In the preferred embodiment, the oscillating motion of swing arm 18 rotates crank arm 21 on receiving machine 14 through the reciprocating action of connecting rod 39. In the configuration of system 10 depicted in FIG. 1, swing arm 18 extends upstream from vane 16 to base 21. In an alternative configuration depicted in FIG. 4, swing arm 18 extends downstream from vane 16 to base 21. In FIG. 4, a compression rod 48 is substituted for tensioning cable 38 to limit the vertical motion of swing arm 18.

Figure 5:
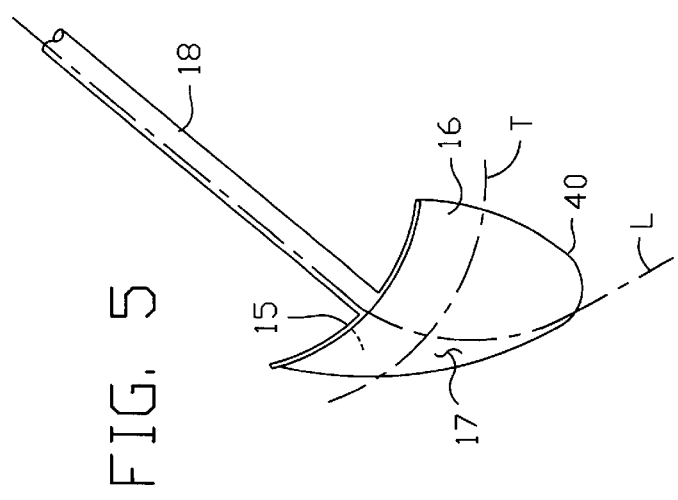
FIG. 5 is a detail isometric view of a vane having a front face that is concave along both its longitudinal and transverse axes, a convex rear face and a curved peripheral edge.
Figure 6:
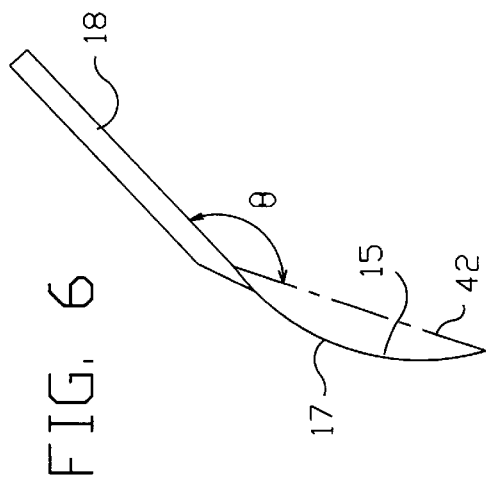
FIG. 6 is a cross section taken along the longitudinal axis of the vane of FIG. 5.
Figure 7:
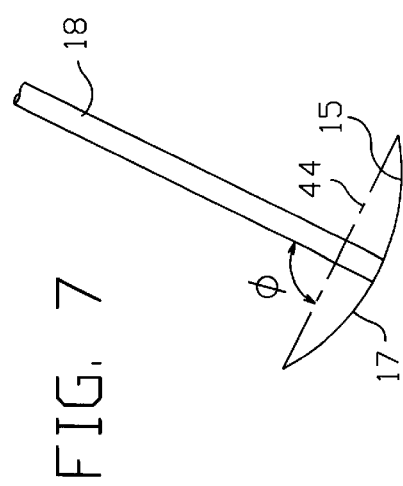
FIG. 7 is a cross section taken along the transverse axis of the vane of FIG. 5.

In the presently preferred embodiment of vane 16, shown in FIGS. 5–7, front face 15 of vane 16 is concave along both a longitudinal axis L and a transverse axis T. Rear face 17 of vane 16 is convex along both longitudinal axis L and transverse axis T. Vane 16 has a curved peripheral edge 40. Referring to FIG. 6, the primary angle of attachment θ of swing arm 18 to vane 16 is preferably in the range of 90° to 225°, most preferably in the range of 150° to 170° for the embodiment of FIG. 1, where θ is the angle between swing arm 18 and a longitudinal chord 42 of vane 16. Primary angle of attachment θ is selected to achieve the desired angle of attack Φ or "bite" of vane 16 in the fluid flow (attack angle Φ is shown in FIGS. 1 and 4). The primary angle of attachment θ will vary, therefore, depending on the height of base 31 and the effective length of swing arm 18, as well as the flow conditions. Referring to FIG. 7, the secondary angle of attachment θ of swing arm 18 to vane 16 is preferably in the range of 45° to 135°, most preferably about 90°, where Φ is the angle between swing arm 18 and a transverse chord 44 of vane 16.

Figure 8:
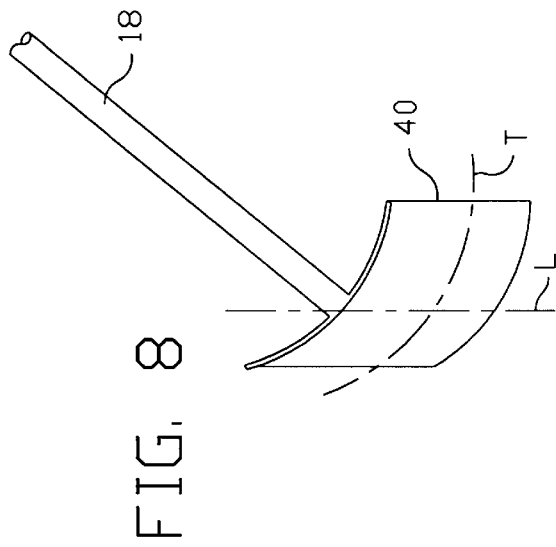
FIG. 8 is a detail isometric view of a vane having a front face that is concave along only its transverse axis and a rectilinear peripheral edge.

Other configurations for vane 16 are possible. For example, it is expected that vane 16 will be most efficient in certain flow conditions if it is concave only along the lateral axis T with a rectilinear peripheral edge 40, as shown in FIG. 8. The hydraulic energy that may be extracted from fluid passing over vane 16 depends on several factors, including the length of the vane, the shape of the vane and the depth and velocity of the flow. The maximum force against the vane is developed when the longitudinal chord 42 of vane 16 is perpendicular to the direction of flow. It is believed that the vane will be most efficient when it deflects the flow a maximum amount while the flow remains parallel across the vane. Cavitation and inefficiency will occur when vane 16 intercepts the flow lines. If the flow is slow, then vane 16 can deflect the flow lines more without cavitation. Conversely, if the flow is fast, then a smaller deflection will cause cavitation. Ideally, the fluid should enter vane 16 nearly parallel to the leading edge and exit nearly parallel to the trailing edge. The shape and chord length of the vane is dependent on the flow conditions. Some flow conditions may require circular concavity, while others may require parabolic or some other concavity. The exact equations of concavity will necessarily be determined, therefore, mathematically or empirically for the particular flow conditions or range of flow conditions in which the system is expected to operate.

While there is shown and described the preferred embodiment of the invention, it is to be understood that this invention is not limited thereto but may be variously embodied to practice within the scope of the following claims.

What is claimed is:

1. An oscillating fluid flow motor, comprising:

a. a vane having a concave front face;

b. an elongated swing arm attached at one end to the vane; and c. a direction control mechanism operatively coupled to the swing arm and configured to rotate the swing arm about its longitudinal axis.

2. A motor according to claim 1, wherein the front face of the vane is concave along both a longitudinal axis and a transverse axis.

3. A motor according to claim 1, wherein the vane has a convex rear face opposing the concave front face.

4. A motor according to claim 1, wherein the attachment is characterized by primary and secondary angles of attachment between the swing arm and the vane and the primary angle of attachment is in the range of 90° to 225°.

5. A motor according to claim 1, wherein the attachment is characterized by primary and secondary angles of attachment between the swing arm and the vane and the primary angle of attachment is in the range of 150° to 170°.

6. A motor according to claim 1, wherein the swing arm extends away from the vane in a direction generally upstream of the vane.

7. A motor according to claim 1, wherein the swing arm extends away from the vane in a direction generally downstream of the vane.

8. A motor according to claim 1, wherein the attachment is characterized by primary and secondary angles of attachment between the swing arm and the vane and the primary angle of attachment is 180° so that the swing arm extends away from and is substantially co-planar with the vane.

9. A motor according to claim 1, wherein the attachment is characterized by primary and secondary angles of attachment between the swing arm and the vane and the secondary angle of attachment is in the range of 45° to 135°.

10. A motor according to claim 1, wherein the attachment is characterized by primary and secondary angles of attachment between the swing arm and the vane and the secondary angle of attachment is about 90°.

11. A motor according to claim 1, wherein the vane has a curved peripheral edge.

12. A motor according to claim 1, wherein the vane has a rectilinear peripheral edge.

13. An in-line fluid flow power system, comprising:
  a. a base;
  b. an elongated swing arm pivotally mounted to the base, the swing arm positioned with respect to the flowing fluid to traverse the fluid between two points which define the ends of a bi-directional stroke of the swing arm;
  c. a vane connected to one end of the swing arm, the vane having a concave front face confronting the flow of fluid;
  d. a direction control mechanism operatively coupled to the swing arm and configured to rotate the swing arm about its longitudinal axis alternately clockwise and counterclockwise at the ends of the stroke of the swing arm; and
  e. a receiving machine operatively coupled to the swing arm.

14. A system according to claim 13, wherein the receiving machine is an electric generator.

15. A system according to claim 13, wherein the receiving machine is a pump.

16. A system according to claim 13, wherein the direction control mechanism comprises a limit arm extending radially out from the swing arm and a pair of stops attached to the base on opposite sides of the limit arm to interfere with the limit arm at the ends of the stroke of the swing arm.

17. A system according to claim 16, wherein the swing arm is mounted to the base through a pivot assembly having a bearing therein for rotatably supporting the swing arm.

* * * * *